(12) United States Patent
Saka et al.

(10) Patent No.: US 6,930,248 B1
(45) Date of Patent: Aug. 16, 2005

(54) AUTOMOTIVE ELECTRICAL CONNECTION BOX

(75) Inventors: Yukinori Saka, Yokkaichi (JP); Tooru Nakagawa, Yokkaichi (JP)

(73) Assignee: Sumitomo Wiring Systems, Ltd., (JP)

( * ) Notice: Subject to any disclaimer, the term of this patent is extended or adjusted under 35 U.S.C. 154(b) by 0 days.

(21) Appl. No.: 10/990,737

(22) Filed: Nov. 17, 2004

(30) Foreign Application Priority Data

Feb. 13, 2004 (JP) .............................. 2004-037426

(51) Int. Cl.[7] .............................................. H02G 3/08
(52) U.S. Cl. ..................... 174/50; 174/59; 174/52.1; 439/76.2; 439/701
(58) Field of Search ............................... 174/50, 58, 59, 174/17 R, 54, 61, 65 R, 48, 52.1; 220/3.2, 220/3.3, 3.8, 4.02; 439/76.1, 364, 76.2, 949, 439/701, 557, 638; 361/600, 752

(56) References Cited

U.S. PATENT DOCUMENTS

| | | | | |
|---|---|---|---|---|
| 4,811,168 A | * | 3/1989 | Chesnut et al. | 361/752 |
| 4,956,748 A | * | 9/1990 | Yamamoto et al. | 439/638 |
| 5,023,752 A | * | 6/1991 | Detter et al. | 361/752 |
| 5,266,047 A | * | 11/1993 | Black et al. | 439/364 |
| 5,271,689 A | * | 12/1993 | Ishii et al. | 439/364 |
| 5,771,151 A | * | 6/1998 | Hotea et al. | 439/76.2 |
| 6,027,360 A | * | 2/2000 | Jenkins | 439/364 |
| 6,419,516 B1 | * | 7/2002 | Parcet | 439/76.2 |
| 6,443,779 B2 | * | 9/2002 | Suzuki | 439/76.2 |
| 6,570,088 B1 | * | 5/2003 | Depp et al. | 174/50 |
| 2002/0176739 A1 | | 11/2002 | Goto et al. | |

FOREIGN PATENT DOCUMENTS

JP          10-302887        11/1998

* cited by examiner

Primary Examiner—Eric W. Thomas
Assistant Examiner—Angel R. Estrada
(74) Attorney, Agent, or Firm—Gerald E. Hespos; Anthony J. Casella

(57) ABSTRACT

Upper and lower casings (10, 11) have the surrounding walls coupled together. A bolt (B) is mounted beforehand in the casings (10, 11), and projects through a bolt hole (11c) in the lower casing (11) to fix the casings (10, 11) to a holder (20). A first bush (15) is fixed in the lower casing (11) and a second bush (16) is interlocked with an outer circumferential surface of the first bush (15). The bolt (B) passes through the bushes (15, 16) so that a lower surface of the bolt head (Ba) engages the upper end surface of the first bush (15). On the other hand, an inward-projection is formed on an upper part of the second bush (16), and contacts the upper surface of the bolt head (Ba). Thus, the bolt head (Ba) is held rotatably between the upper end surface of the first bush (15) and the inward-projection.

14 Claims, 7 Drawing Sheets

AUTOMOTIVE ELECTRICAL CONNECTION BOX

BACKGROUND OF THE INVENTION

1. Field of the Invention

The invention relates to an automotive electrical connection box.

2. Description of the Related Art

JP 10-302887 and FIG. 6 herein disclose an automotive electrical connection box. With reference to FIG. 6, the electrical connection box has lower and upper casings 1, 2 with surrounding walls that are lockingly coupled together with a lower cover 3. Connectors 4 are provided on the lower cover 3. A bolt B is introduced through the casings 1, 2 and is screwed into a bolt inserting portion 5 in the middle of connectors 4 in the lower cover 3. Thus, the casings 1, 2 are locked together and are fixed to the lower cover 3.

The bolt B can be unthreaded to release the casings 1, 2 from the lower cover 3. However, the casings 1, 2 are not raised automatically and detached from the lower cover 3 as the bolt B is unthreaded. Rather, an operator has to detach the casings 1, 2 from the lower cover 3 after the bolt B is unthreaded, thereby increasing operation steps.

The bolt B is not assembled with the casings 1, 2 beforehand. Rather, the bolt B must be inserted through the casings 1, 2 later to fix the casings 1, 2 to the lower cover 3. This subsequent insertion of the bolt B presents a parts administration problem.

FIG. 7 shows an electrical connection box that has been proposed to address the above-described problems. The electrical connection box of FIG. 7 has lower and upper casings 1, 2 with surrounding walls that are coupled together by locks. The lower casing 1 has a bolt hole and a collar 7 extends from the peripheral edge of a bolt hole. A flange 7a is defined on the collar 7. The upper casing 2 is formed integrally with a bolt inserting portion 2a. A small hole 2a-1 is formed in an upper part of the bolt inserting portion 2a and a large hole 2a-2 is formed in a lower part of the bolt inserting portion 2a. Thus, a downwardly facing step is defined in the bolt insertion portion 2a between the small hole 2a-1 the large hole 2a-2.

A bolt B is assembled with the casings 1, 2 to mount the assembled casings 1, 2 to a fixing member 6, such as a vehicle body, a holder or a lower cover. The bolt B is introduced through the collar 7 of the lower casing 1 and into the bolt inserting portion 2a of the upper casing 2. The large hole 2a-2 of the bolt inserting portion 2a surrounds the outer circumferential surface of a head Ba the bolt B with a specified clearance. However, the upper surface of the bolt head Ba contacts the downwardly facing step between the small and large holes 2a-1, 2a-2. Thus, the upper and lower surfaces of the head Ba are held rotatably between the downwardly facing step of the bolt insertion portion 2a and the upper end surface of the flange 7a of the collar 7.

The head Ba of the bolt B is exposed upwardly at the small hole 2a-1. Thus, an impact wrench (not shown) can be inserted into the bolt inserting portion 2a of the upper casing 2 from above. The impact wrench can engage the head Ba to screw the bolt B into a nut N embedded in the fixing member 6, thereby fixing the lower and upper casings 1, 2 to the fixing member 6.

The lower and upper casings 1, 2 can be detached from the fixing member 6 by inserting the impact wrench into the bolt inserting portion 2a of the upper casing 2. The bolt head Ba then is turned in a reverse direction to disengage the bolt B from the nut N. As a result, the upper end surface of the bolt head Ba pushes up on the downwardly facing step between the small hole 2a-1 and the large hole 2a-2 of the upper casing 2. Thus, the upper casing 2 is moved up and away from the fixing member 6. The surrounding walls of the lower and upper casings 1, 2 are locked together, and hence the lower casing 1 moves up with the upper casing 2. Accordingly, the lower and upper casings 1, 2 can be detached integrally from the fixing member 6.

The single bolt B in the middle of the casings 1, 2 is spaced from the locks on the surrounding walls. Forces exerted by the bolt B act on a middle part of the upper casing 2, but do not act over the entire upper casing 2. Accordingly, a part of the upper casing 2 near the bolt B deforms up. This deformation may cause the locks on the surrounding walls to disengage from the lower casing 1. Thus, only the upper casing 2 may detach with the bolt B, leaving the lower casing 1 on the fixing member 6.

The casings 1, 2 are locked only at the surrounding walls. Thus, the middles of the casings 1, 2 are likely to shake if the casings are large.

The invention was developed in view of the above problems, and an object is to improve operability during the mounting/dismounting of the electrical connection box to a holder or a body of a vehicle body.

SUMMARY OF THE INVENTION

The invention relates to an electrical connection box with first and second casings. A first bush is fixed to the second casing and a second bush is interlocked with the outer surface of the first bush. A bolt is inserted through the first bush and through a bolt hole in a wall of the second casing. The casings then are coupled together so that an end surface of the first bush is brought into contact with a surface of a head of the bolt, while an inward projection on the inner surface of the second bush is brought substantially into contact with an opposed surface of the bolt head. The bolt then fixes the casings to a fixing member, such as a vehicle body panel. The inward projection of the second bush is pushed by the bolt head as the bolt is detached away from the fixing member. Thus, the lockingly coupled first and second casings can be detached simultaneously from the fixing member.

The second bush may be interlocked threadedly with the outer circumferential surface of the first bush. Alternatively, the second bush may be interlocked with the outer surface of the first bush by a bayonet locking.

The second bush engages a surface of the bolt head and is pushed up by the bolt head when the bolt is being detached. The first bush is interlocked with the second bush and hence the first bush also is pushed up. The first bush is fixed in the second casing, and consequently the second casing is pushed up. The casings are coupled together and can be detached from the fixing member in synchronism with the bolt detaching operation.

The bushes preferably are made of metal, and hence can push the resin casings with a strong force. Thus, the casings are detached more reliably from the fixing member in synchronism with the bolt detaching operation.

An outward projection preferably is provided at the end of the second bush and contacts a surface around a bolt hole in a first wall of the first casing. The projection holds the first wall of the first casing in a bolt-fastened state.

The outward-projection at the end of the second bush holds the first wall of the first casing. Thus, the first casing receives a force exerted on the second casing. As a result, the first and second casings are prevented from shaking with respect to each other. Even in a large casing, the first and second casings are coupled lockingly at their surrounding walls and also are coupled at more central positions by the second bush. Accordingly, the first and second casings are prevented from shaking with respect to each other.

The outward-projection at the end of the second bush engages the first wall of the first casing. Thus, the first casing will not disengage from the second casing when the bolt is being detached. Therefore, the casings can be detached more reliably.

One single bolt preferably is mounted at substantially center positions of the first and second casings. However, two or more bolts may be used.

Locks preferably are provided on the surrounding walls of the casings distanced from a bolt-fastened position to lockingly couple the casings together.

The first bush preferably is fixed in the second casing by insert-molding or by press fitting the first bush into the bolt hole of the second casing.

A bolt head of the bolt is located inside the first and second bushes and is exposed to the outside at a position substantially facing the bolt hole of the first casing.

The second housing preferably comprises at least one mounting portion for mounting a connector to the second housing.

An uneven number of mounting portions may be provided in the second housing. In this situation, the second housing may have at least one dummy portion at a position substantially symmetrically on the opposite side of the collar from the mounting portion that has no symmetric counterpart. The dummy portion substantially balances stresses created during the fastening by the bolt in the collar.

The above-described electrical connection box enables the lockingly coupled casings to be detached reliably and simultaneously from the fixing member as the bolt is detached. Thus, an operation of detaching the casings from the fixing member after the bolt is detached can be eliminated, thereby improving operational efficiency.

The bolt is mounted beforehand in the casings. Thus, the casings can be fixed to the fixing member or detached from the fixing member merely by inserting a wrench-like tool through the bolt hole of the first casing and turning the bolt with the tool. This also improves the operational efficiency.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
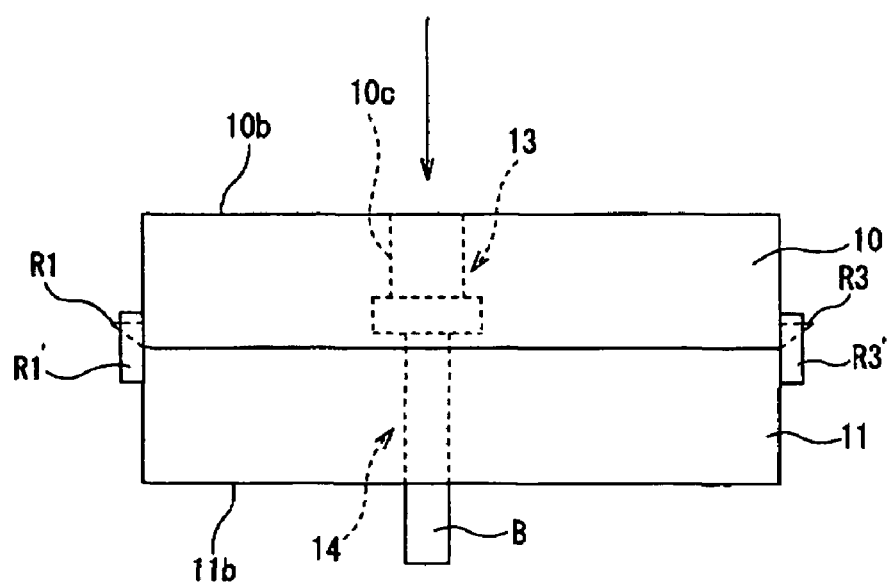
FIG. 1 is a schematic diagram showing one embodiment of the invention.
Figure 1:
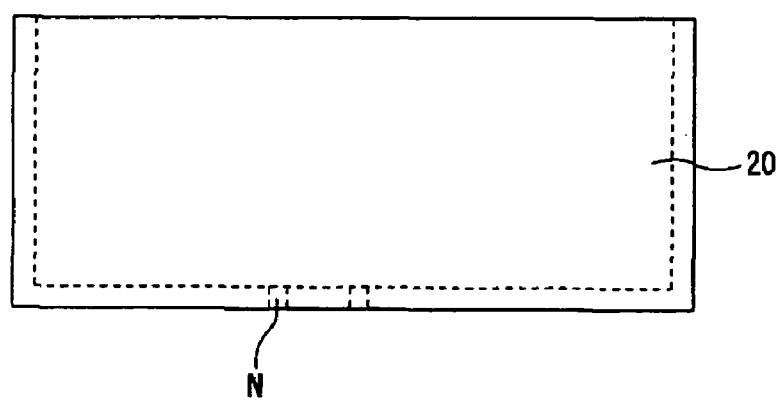

FIG. 1 is a schematic diagram showing an upper casing 10, a lower casing 11 and a holder 20. The upper casing 10 and the lower casing 11 are coupled lockingly together beforehand and are fixed to the holder 20 by engaging a bolt B with a nut N embedded in or fixed on the holder 20. Of course, the casings 10, 11 could be fixed to a vehicle body panel or other such fixing member instead of the holder 20. Additionally, the terms upper and lower are used herein for a convenient frame of reference and are not intended to imply a required gravitational orientation.

Bolt mounting portions 13, 14 are provided in substantially central portions of an upper wall 10b of the upper casing 10 and a bottom wall 11b of the lower casing 11. The bolt B is held rotatably in the bolt mounting portions 13, 14. An impact wrench (not shown) can be inserted through a bolt hole 10c in the substantially central portion of the upper wall 10b of the upper casing 10 to turn a head Ba of the bolt B. Thus, the bolt B engages the nut N embedded in the holder 20 or disengages the bolt B from the nut N.

The upper and lower casings 10, 11 has surrounding walls 10a, 11a spaced out from the bolt B. Locks R1 to R5 are provided on the two longer sides of the surrounding wall 10a of the upper casing 10, whereas engaging portions R1' to R5' are provided at substantially corresponding positions of the surrounding wall 11a of the lower casing 11.

The locks R1 to R5 engage the engaging portions R1' to R5' to lockingly couple the casings 11, 10 together as the surrounding wall 10a of the upper casing 10 is fit in the surrounding wall 11a of the lower casing 11.

Figure 2:
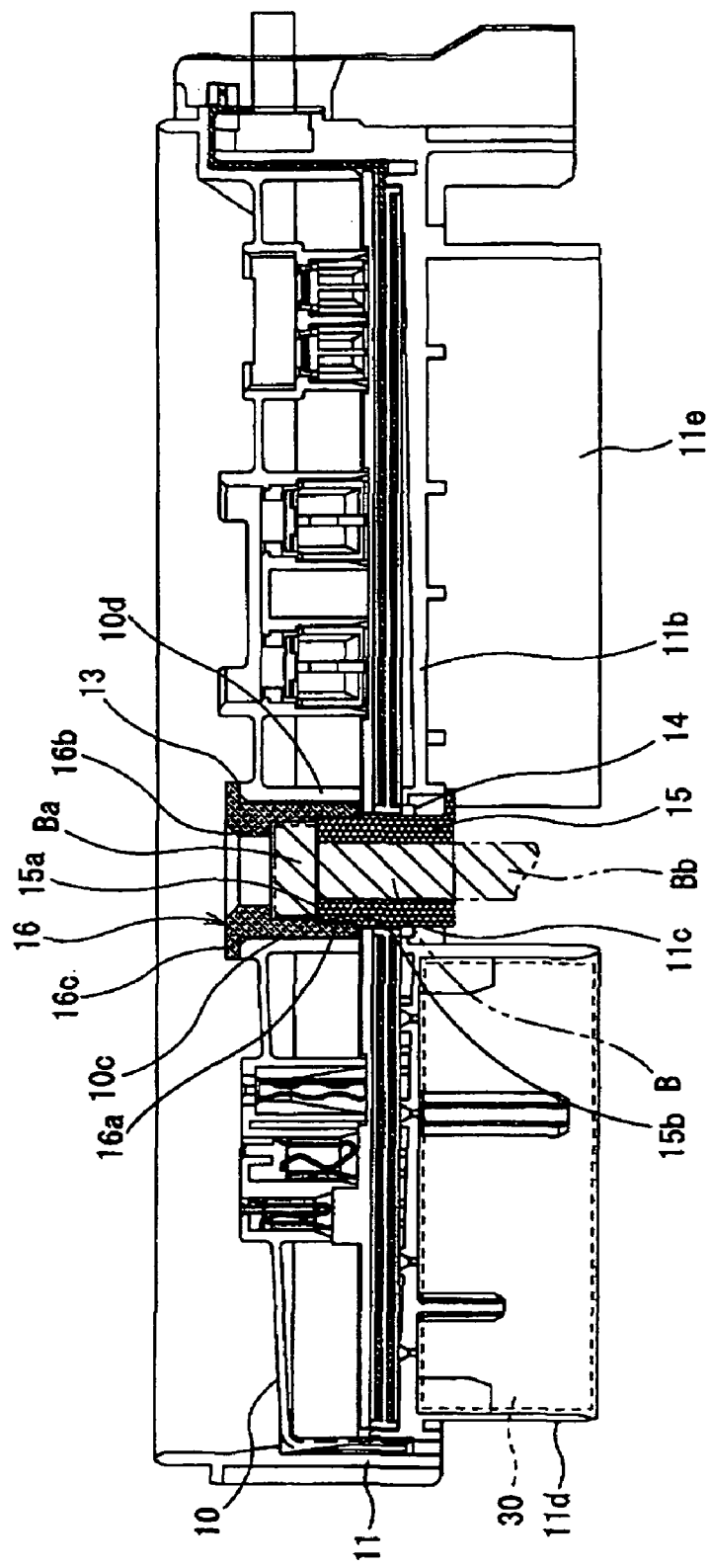
FIG. 2 is a vertical section showing a state where a lower casing and an upper casing according to the embodiment of the invention are assembled.
Figure 3:
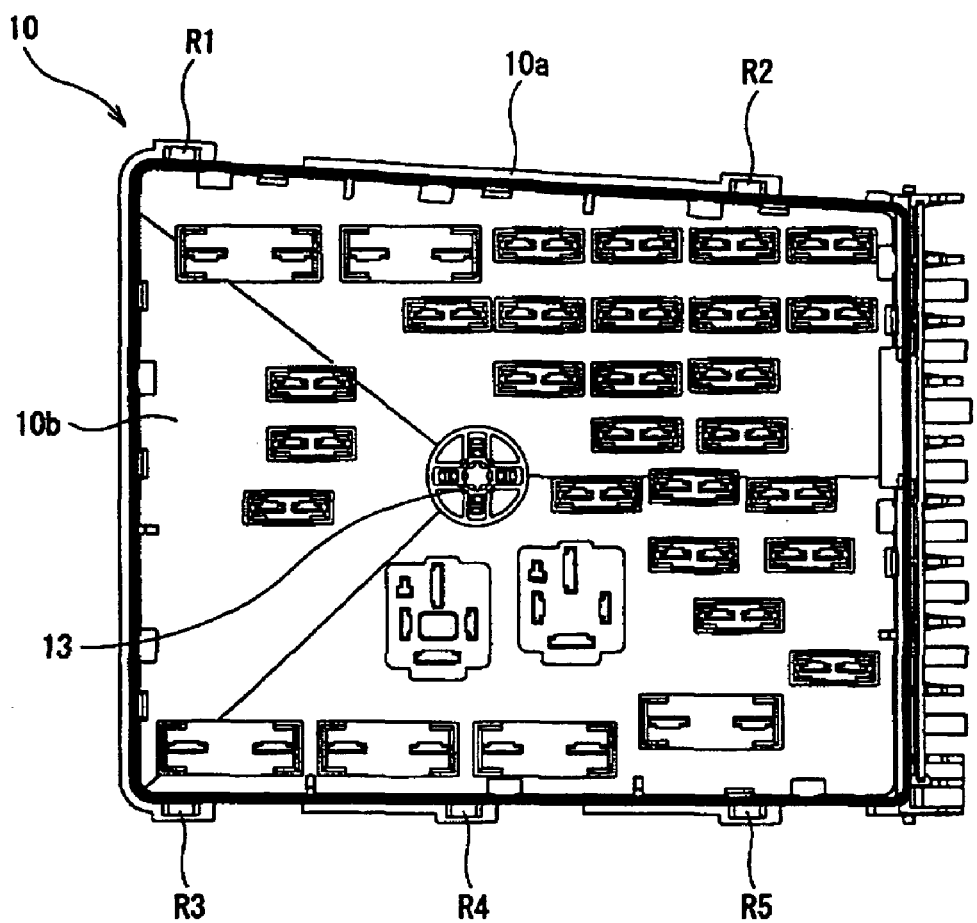
FIG. 3 is a plan view of the upper casing.

The bolt mounting portions 13, 14 are illustrated most clearly FIG. 2. Specifically, a hard metallic cylindrical tubular first bush 15 extends from the peripheral edge of a bolt hole 11c of the bottom wall 11b of the lower casing 11. The first bush 15 is mounted in the lower casing 11 by insert-molding.

The first bush 15 projects from the inside of the lower casing 11 to the inside of the upper casing 10, and an upper end surface 15a of first bush 15 is set at a position to support a lower surface of the head Ba of the bolt B.

An externally threaded portion 15b is formed on an upper part of the outer circumferential surface of the first bush 15 and is engageable with an internally threaded portion 16a on the inner circumferential surface of a second bush 16 so that the second bush 16 projects from the first bush 15.

An inward projection 16b is formed on the second bush 16 and contacts an upper surface of the bolt head Ba. Accordingly, the bolt head Ba is held rotatably between the inward projection 16b and the upper end surface 15a. The inward projection 16b and the upper end surface 15a are spaced by a distance substantially corresponding to the thickness or longitudinal extension of the bolt head Ba (refer e.g. to FIG. 2). An outward-projecting flange 16c is formed at the upper end of the second bush 16.

The upper casing 10 has a cylindrical portion 10d that projects down towards the lower casing 11 from the periphery of the bolt hole 10c and fits around the second bush 16. The outward projection 16c of the second bush 16 is engaged with the upper end surface of the cylindrical portion 10d.

Figure 4:
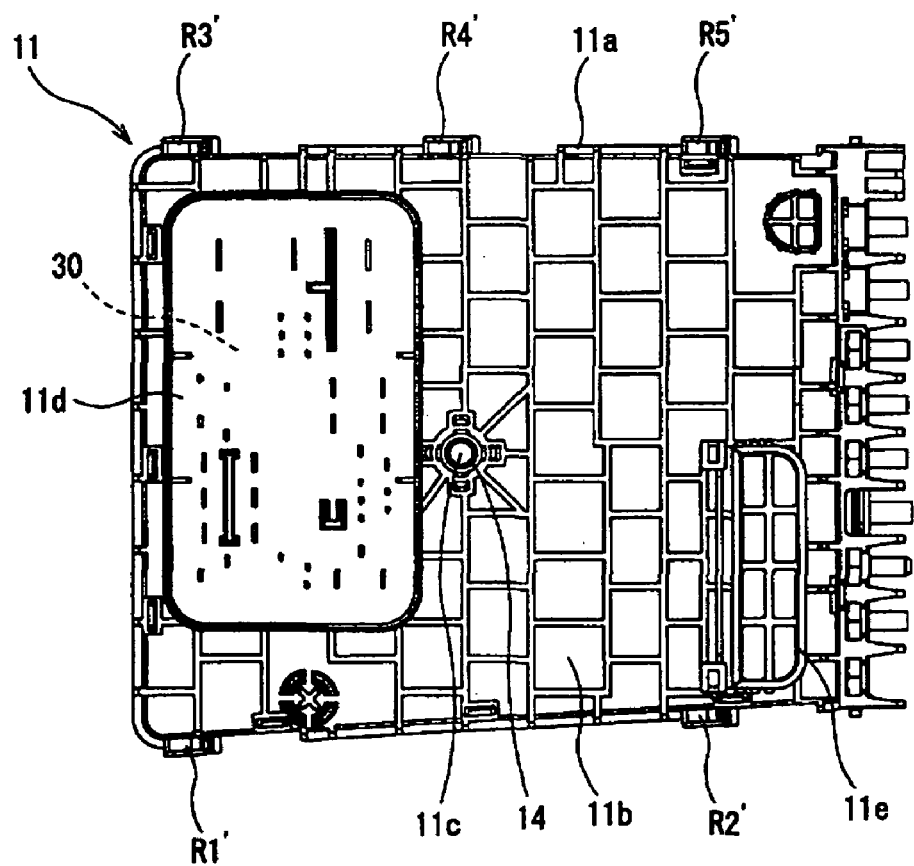
FIG. 4 is a bottom view of the lower casing.
Figure 5:
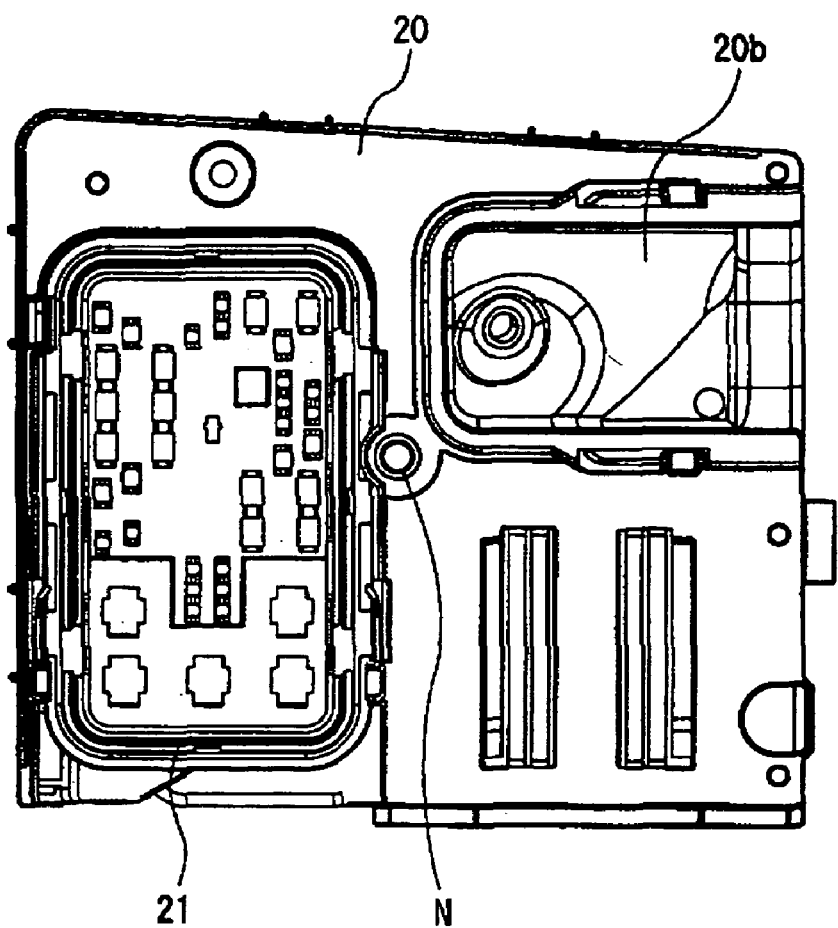
FIG. 5 is a plan view of a holder to which the casings are fixed.
Figure 6:
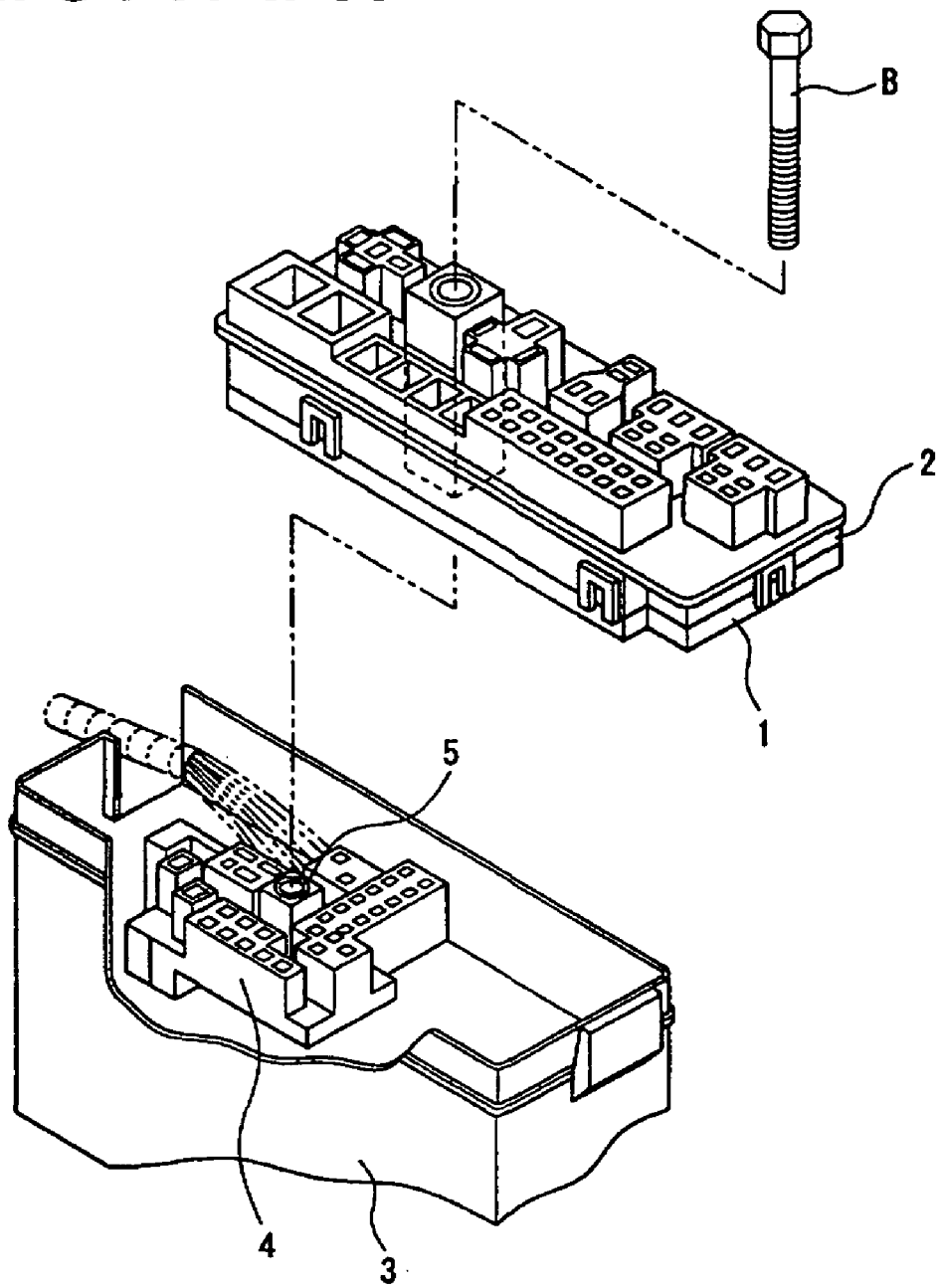
FIG. 6 is an exploded perspective view of a prior art electrical connection box.
Figure 7:
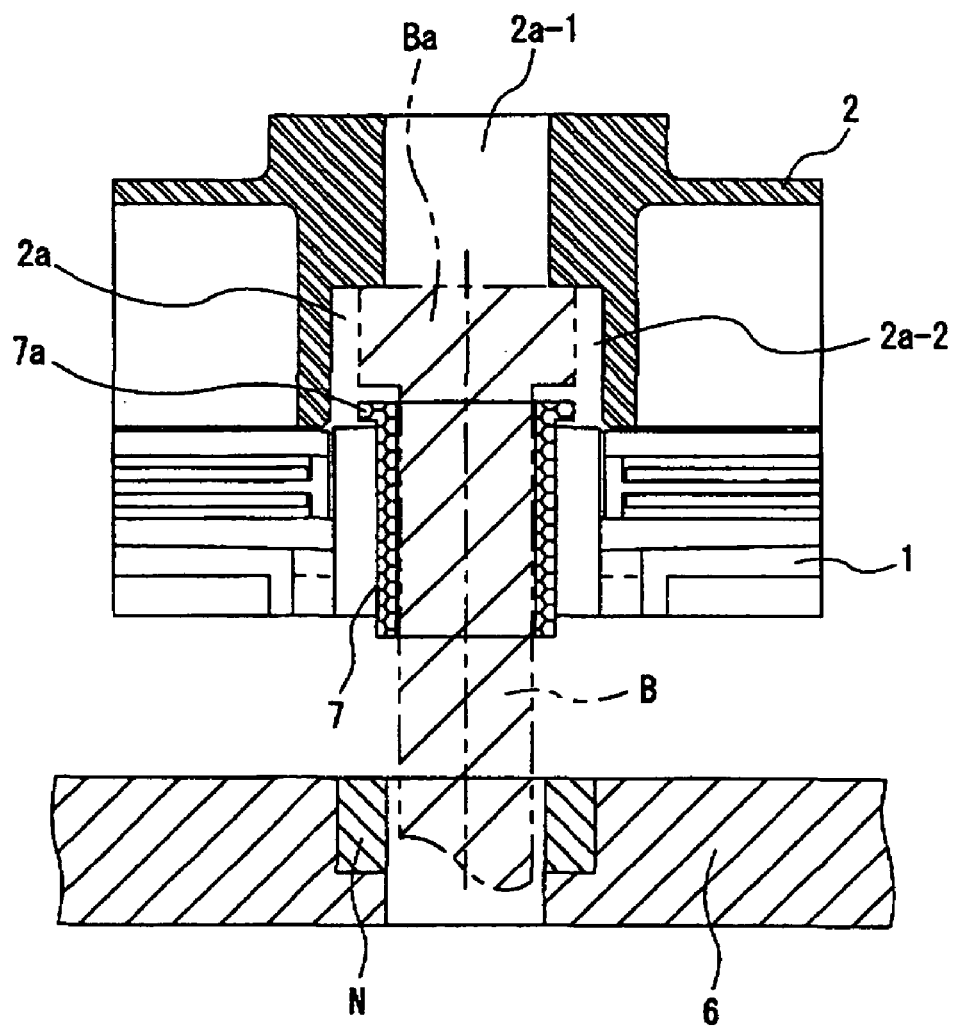
FIG. 7 is a section of another prior art electrical connection box.

The lower casing 11 has a mounting portion 11d for a mating connector 30 that is connectable with a waiting-side connector 21. The mounting portion 11d projects down at one side of the collar 15 as shown in FIGS. 2 and 4, so that the mating connector 30 can be connected with the waiting-side connector 21 in the holder 20, as shown in FIG. 5, substantially simultaneously with the fastening by the bolt B.

A connecting portion of the waiting-side connector 21 and the mating connector 30 is at only one side of the bolt B. Thus, a dummy housing 11e projects in the lower casing 11 at the other side of the bolt B and an opening 20b is formed in the holder 20 to receive the dummy housing 11e and to substantially balance stresses created during the fastening by the bolt B. As a result, the mating connector 30 can be connected properly with the waiting-side connector 21 without being obliquely inserted.

The casings 10, 11, 10 are assembled by first inserting a shaft Bb of the bolt B into the first bush 15 of the lower casing 11 from above to place the bolt head Ba on the upper end surface 15a of the first bush 15. Thus, the bolt shaft Bb projects down towards the fixing member 20 from the bottom wall of the lower casing 11.

The upper casing 10 then is assembled with the lower casing 11 and the locks R1 to R5 and the engaging portions R1' to R5' on the surrounding walls are coupled lockingly together.

Thereafter, the second bush 16 is inserted into the bolt hole 10c of the upper casing 10 and the threads 16a of the second bush 16 are fixed to the threads 15b of the first bush 15. In this state, the inward projection 16b of the second bush 16 contacts the upper surface of the bolt head Ba, and the outward projection 16c at the upper end of the second bush 16 contacts the upper end surface of the cylindrical portion 10d of the upper casing 10. Additionally, the bolt head Ba is held rotatably between the upper end surface 15a of the first bush 15 and the inward projection 16b of the second bush 16. The bolt head Ba is inside the second bush 16, but is exposed to the outside at a position facing the bolt hole 10c of the upper casing 10.

The bottom end of the bolt shaft Bb projects down from the lower casing 11 and is aligned with the nut N of the holder 20. The impact wrench (not shown) then is inserted into a hollow portion of the second bush 16 so that the leading end of the impact wrench engages a groove in the upper surface of the bolt head Ba. The bolt B then is turned and engages the nut N to fix the upper and lower casings 10, 11 to the holder 20.

The outward projection 16c at the upper end of the second bush 16 projects from the first bush 15 and contacts the upper end surface of the cylindrical portion 10d of the upper casing 10 to prevent the upper casing 10 from being disengaged from the lower casing 11.

The impact wrench can be inserted from above into the hollow portion of the second bush 16 and turned in reverse direction to raise the bolt B and to disengage the bolt B from the nut N. The bolt head Ba pushes the inward-projection 16b of the second bush 16 up and away from the holder 20 as the bolt B is raised. The second bush 16 is fixed to the first bush 15 and the first bush 15 is fixed to the lower casing 11. Thus, the lower casing 11 is pushed up as the bolt B is raised. At this time, the outward-projection 16c at the upper end of the second bush 16 is engaged with the upper surface of the cylindrical portion 10d of the upper casing 10. As a result, the upper casing 10 cannot disengage from the lower casing 11.

The lower casing 11 is pushed up and away from the holder 20 as the bolt B is disengaged from the nut N. However, the upper casing 10 is coupled lockingly to the lower casing 11. Thus, the upper casing 20 is pushed up and away from the holder 20 together with the lower casing 11. As a result, both casings 11, 10 are detached from the holder 20 as the bolt B is detached.

As described above, the bushes 15, 16 push the lower casing 11 up and away from the holder 20 as the bolt is rotated during the bolt detaching operation. The upper casing 10 is above the lower casing 11 and is pushed up entirely uniformly by the lower casing 11. In other words, the upper casing 10 is pushed away from the holder 20 by the lower casing 11, which is arranged at an intermediate position between the upper casing 10 and the holder 20.

Accordingly, the casings 10, 11 can be detached simultaneously from the holder 20 without being freed from their locked state, even if only one bolt B is mounted at a central portion of the casings 10, 11 and if the locks of the casings 10, 11 are distanced from the bolt B. In other words, the lower casing 11 is prevented from being left fixed to the holder 20.

The bolt B is mounted in the casings 10, 11 beforehand and the casings 10, 11 can be detached as the bolt B is detached. Thus, the casings 10, 11 easily can be fixed to and detached from the holder 20 merely by using the impact wrench or other such tool.

The lockingly coupled casings 11, 10 are fixed to the holder 20 in the foregoing embodiment. However, the invention is applicable to a case where they are fixed to a vehicle body panel, dash panel or the like.

The invention was described with respect to threadedly interconnected bushes 15, 16. However, the bushes may be interlocked axially in a different way, such as bayonet fitting, interlocking or press fitting.

What is claimed is:

1. An electrical connection box, comprising
   first and second casings lockingly coupled together, the second casing having a wall with a bolt hole;
   a first bush fixed in the second casing and being substantially aligned with the bolt hole, the first bush having an end surface;
   a bolt amounted rotatably through the first bush and through the bolt hole in the wall of the second casing for fixing the casings to a fixing member, the bolt having a bolt head with a opposite first and second surfaces, the second surface of the bolt head engaging the end surface of the first bush; and
   a second bush interlocked with an outer circumferential surface of the first bush and having an inward projection engaging the first surface of the bolt head, whereby the first surface of the bolt head pushes the inward projection of the second bush upon detaching the bolt from the fixing member, whereby the lockingly coupled first and second casings can be simultaneously detached from the fixing member.

2. The electrical connection box of claim 1, wherein the second bush is threadedly interlocked with the first bush.

3. The electrical connection box of claim 1, wherein the second bush is interlocked with the first bush by a bayonet locking.

4. The electrical connection box of claim 1, wherein one single bolt is mounted at substantially center positions of the first and second casings.

5. The electrical connection box of claim 1, wherein the first casing has a first wall with a bolt hole, the second bush having an end with an outward-projection contacting a surface around the bolt hole in the first wall of the first casing for holding the first wall of the first casing in a bolt-fastened state.

6. The electrical connection box of claim 5, wherein the bolt head is exposed externally at a position substantially facing the bolt hole of the first casing.

7. The electrical connection box of claim 1, wherein the first and second casings have surrounding walls distanced from the bolt hole, locks provided on surrounding walls to lockingly couple the first and second casings together.

8. The electrical connection box of claim 1, wherein the second casing comprises at least one mounting portion for mounting a connector to the second casing.

9. The electrical connection box of claim 8, wherein an uneven number of mounting portions are provided in the second casing and at least one dummy portion is mounted in the second casing at a position with respect to the bolt and the mounting portions to substantially balance stresses created during fastening of the bolts.

10. A method for assembling an electrical connection box for mounting to a support, the electrical connection box having a first casing with a first wall having a first bolt hole therethrough, and a second casing having a second wall with a second bolt hole therethrough, a second bush being secured to the second wall at the second bolt hole, the method comprising:
providing a bolts with a shaft configured for engaging the support and a head at one end of the shaft, the head having a first surface facing away from the shaft and a second surface substantially facing the shaft;
passing the shaft of the bolt through the second bush and through the second bolt hole so that the second surface of the head of the bolt is supported rotatably on an end of the second bush;
mounting the first casing to the second casing so that the second bolt hole substantially registers with the head of the bolt;
mounting a first bush through the first bolt hole; and
engaging the first bush with the second bush so that an interior step of the first bush opposes the first surface of the head of the bolt for permitting relative rotation between the bolt and the first bush.

11. The method of claim 10, wherein the step of mounting the first casing to the second casing comprises locking surrounding walls of the first casing to surrounding walls of the second casing.

12. The method of claim 11, wherein the step of mounting the first bush includes engaging a flange of the first bush with a surface of the first wall opposite the second casing.

13. The method of claim 11, further comprising:
positioning the electrical connection box on the support with the shaft of the bolt aligned with a threaded nut of the support;
inserting a tool through the first bolt hole and into engagement with the head of the bolt; and
using the tool to rotate the bolt in a first rotational direction so that the shaft of the bolts advances threadedly into the nuts of the support and so that the second surface of the head of the bolt exerts forces on the second bush for securing the electrical connection box to the support.

14. The method of claim 13, further comprising:
using the tool to rotate the bolt in a second rotational direction so that the shaft of the bolt is withdrawn threadedly from the nut of the support and so that the first surface of the head of the bolt exerts forces on the interior portion of the first bush for simultaneously separating the first and second bushes and the first and second casings from the support.

* * * * *